(12) United States Patent
Ayai

(10) Patent No.: US 11,404,974 B2
(45) Date of Patent: Aug. 2, 2022

(54) POWER CONVERTER FOR PERFORMING CONVERSION FROM DC TO AC OR VICE VERSA, AND METHOD FOR CONTROLLING THE POWER CONVERTER

(71) Applicant: SUMITOMO ELECTRIC INDUSTRIES, LTD., Osaka (JP)

(72) Inventor: Naoki Ayai, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/290,443

(22) PCT Filed: Aug. 28, 2019

(86) PCT No.: PCT/JP2019/033657
§ 371 (c)(1),
(2) Date: Apr. 30, 2021

(87) PCT Pub. No.: WO2020/152900
PCT Pub. Date: Jul. 30, 2020

(65) Prior Publication Data
US 2021/0384845 A1      Dec. 9, 2021

(30) Foreign Application Priority Data

Jan. 22, 2019   (JP) .............................. JP2019-008588

(51) Int. Cl.
*H02M 7/538* (2007.01)
*H02M 7/5387* (2007.01)
(Continued)

(52) U.S. Cl.
CPC ..... *H02M 7/5387* (2013.01); *H02M 3/33584* (2013.01); *H02M 7/5395* (2013.01);
(Continued)

(58) Field of Classification Search
CPC ........... H02M 7/5387; H02M 3/33584; H02M 7/5395; H02M 1/0048; H02M 1/0054;
(Continued)

(56) References Cited

U.S. PATENT DOCUMENTS

2013/0301323 A1* 11/2013 Iyasu ................... H02M 1/4233
                                                                363/123
2016/0329829 A1* 11/2016 Ayai ..................... H02M 7/5387
(Continued)

FOREIGN PATENT DOCUMENTS

CN          108448922 A      8/2018
DE          10221592 A1     12/2003
(Continued)

*Primary Examiner* — Yusef A Ahmed
(74) *Attorney, Agent, or Firm* — Oliff PLC

(57) ABSTRACT

In a High Efficient and Reliable Inverter Concept power conversion device, control is performed with one cycle divided into four periods, wherein in a first period when the signs of an AC voltage and an AC current are both positive, first and fourth switches perform switching operation, second and third switches are opened, and a sixth switch is closed; in a second period when the signs are positive and negative, a current is passed through freewheeling diodes when a fifth switch is opened while the fifth switch performs switching operation; in a third period when both signs are negative, the second and third switches perform switching operation, the first and fourth switches are opened, and the fifth switch is closed; and in a fourth period when the signs are negative and positive, a current is passed through freewheeling diodes when the sixth switch is opened while the sixth switch performs switching operation.

9 Claims, 12 Drawing Sheets

(51) Int. Cl.
*H02M 7/5395* (2006.01)
*H02M 3/335* (2006.01)
*H02M 1/00* (2006.01)
*H02M 7/483* (2007.01)

(52) U.S. Cl.
CPC ........ *H02M 7/53871* (2013.01); *H02M 1/007* (2021.05); *H02M 7/483* (2013.01)

(58) Field of Classification Search
CPC .......... H02M 1/007; H02M 1/12; H02M 1/38; H02M 1/42; H02M 3/158; H02M 7/483
See application file for complete search history.

(56) References Cited

U.S. PATENT DOCUMENTS

| | | | |
|---|---|---|---|
| 2018/0183319 A1* | 6/2018 | Akita | H02J 7/0068 |
| 2018/0262012 A1* | 9/2018 | Ayai | H02J 3/46 |
| 2018/0287390 A1* | 10/2018 | Nakajima | H02J 3/383 |
| 2018/0287511 A1* | 10/2018 | Ayai | H02M 1/14 |
| 2019/0006957 A1* | 1/2019 | Ito | H02M 7/483 |
| 2020/0169187 A1* | 5/2020 | Kobayashi | H02M 1/08 |

FOREIGN PATENT DOCUMENTS

| | | |
|---|---|---|
| EP | 2980979 A1 | 2/2016 |
| JP | 2014-209841 A | 11/2014 |
| JP | 2015-77061 A | 4/2015 |
| JP | 6394760 B1 | 9/2018 |
| WO | 2014/157700 A1 | 10/2014 |

\* cited by examiner

POWER CONVERTER FOR PERFORMING CONVERSION FROM DC TO AC OR VICE VERSA, AND METHOD FOR CONTROLLING THE POWER CONVERTER

TECHNICAL FIELD

The present invention relates to a power conversion device and a control method therefor.

This application claims priority on Japanese Patent Application No. 2019-008588 filed on Jan. 22, 2019, the entire content of which is incorporated herein by reference.

BACKGROUND ART

A HERIC (High Efficiency & Reliable Inverter Concept (HERIC is a registered trademark, the same applies hereinafter)) power conversion device is known as a circuit configuration in which a full-bridge circuit as an inverter and a short-circuit section (clamp circuit) on the AC side are combined (see, for example, PATENT LITERATURES 1 to 5).

CITATION LIST

Patent Literature

PATENT LITERATURE 1: German Patent Application Publication No. 10221592
PATENT LITERATURE 2: Japanese Laid-Open Patent Publication No. 2014-209841
PATENT LITERATURE 3: International Publication No. WO2014/157700
PATENT LITERATURE 4: Japanese Laid-Open Patent Publication No. 2015-77061
PATENT LITERATURE 5: Japanese Patent No. 6394760

SUMMARY OF INVENTION

The means of the present disclosure can be expressed as follows, for example. However, the present invention is defined by the claims.

The present disclosure is directed to a power conversion device provided between a DC electrical path and an AC electrical path and configured to perform conversion from DC to AC or vice versa, the power conversion device including: a full-bridge circuit configured by a first switch, a second switch, a third switch configured to operate in synchronization with the second switch, and a fourth switch configured to operate in synchronization with the first switch; a freewheeling diode provided along with the full-bridge circuit and being for passing a current in a forward direction thereof; an AC reactor existing between the full-bridge circuit and the AC electrical path; a short-circuit section provided between two lines on an AC side of the full-bridge circuit and including a fifth switch configured to open and close a current conduction path from a first line to a second line of the two lines, a sixth switch configured to open and close a current conduction path from the second line to the first line, a diode configured to block a current from the first line to the second line and existing in series with the sixth switch, and a diode configured to block a current from the second line to the first line and existing in series with the fifth switch; and a controller configured to control the full-bridge circuit and the short-circuit section, wherein, when there is a phase difference between an AC voltage of the AC electrical path and an AC current flowing through the AC reactor, the controller performs control with one cycle divided into a total of four periods, that is, a first period in which both the AC voltage and the AC current are positive, a second period in which the AC voltage is positive and the AC current is negative, a third period in which both the AC voltage and the AC current are negative, and a fourth period in which the AC voltage is negative and the AC current is positive, the controller executes, in the first period, a first control mode in which the first switch and the fourth switch are caused to perform switching operation, the second switch and the third switch are opened, and the sixth switch is closed, the controller executes, in the second period, a second control mode in which a current is passed through the freewheeling diode when the fifth switch is opened while the fifth switch is caused to perform switching operation, the controller executes, in the third period, a third control mode in which the second switch and the third switch are caused to perform switching operation, the first switch and the fourth switch are opened, and the fifth switch is closed, and the controller executes, in the fourth period, a fourth control mode in which a current is passed through the freewheeling diode when the sixth switch is opened while the sixth switch is caused to perform switching operation.

A control method is a control method for a power conversion device provided between a DC electrical path and an AC electrical path and including a full-bridge circuit configured by switches and a freewheeling diode and a short-circuit section and an AC reactor connected on an AC side of the full-bridge circuit, the control method being executed by a controller, the control method including: when there is a phase difference between an AC voltage of the AC electrical path and an AC current flowing through the AC reactor, performing control with one cycle divided into a total of four periods, that is, a first period in which both the AC voltage and the AC current are positive, a second period in which the AC voltage is positive and the AC current is negative, a third period in which both the AC voltage and the AC current are negative, and a fourth period in which the AC voltage is negative and the AC current is positive; executing, in the first period, control that alternately has a powering period in which the full-bridge circuit is caused to perform switching operation and a current is passed through the full-bridge circuit in a positive direction and a freewheeling period in which a current is passed through the short-circuit section in the positive direction in a state where all the switches of the full-bridge circuit are opened; executing, in the second period, control that alternately has a powering period in which the short-circuit section is caused to perform switching operation and a current is passed through the short-circuit section in a negative direction and a freewheeling period in which a current is passed through the freewheeling diode of the full-bridge circuit in the negative direction in a state where all the switches are opened; executing, in the third period, control that alternately has a powering period in which the full-bridge circuit is caused to perform switching operation and a current is passed through the full-bridge circuit in the negative direction and a freewheeling period in which a current is passed through the short-circuit section in the negative direction in a state where all the switches of the full-bridge circuit are opened; and executing, in the fourth period, control that alternately has a powering period in which the short-circuit section is caused to perform switching operation and a current is passed through the short-circuit section in the positive direction and a freewheeling period in which a current is passed through the freewheeling diode of the full-bridge circuit in the positive direction in a state where all the switches are opened.

DESCRIPTION OF EMBODIMENTS

Figure 1:
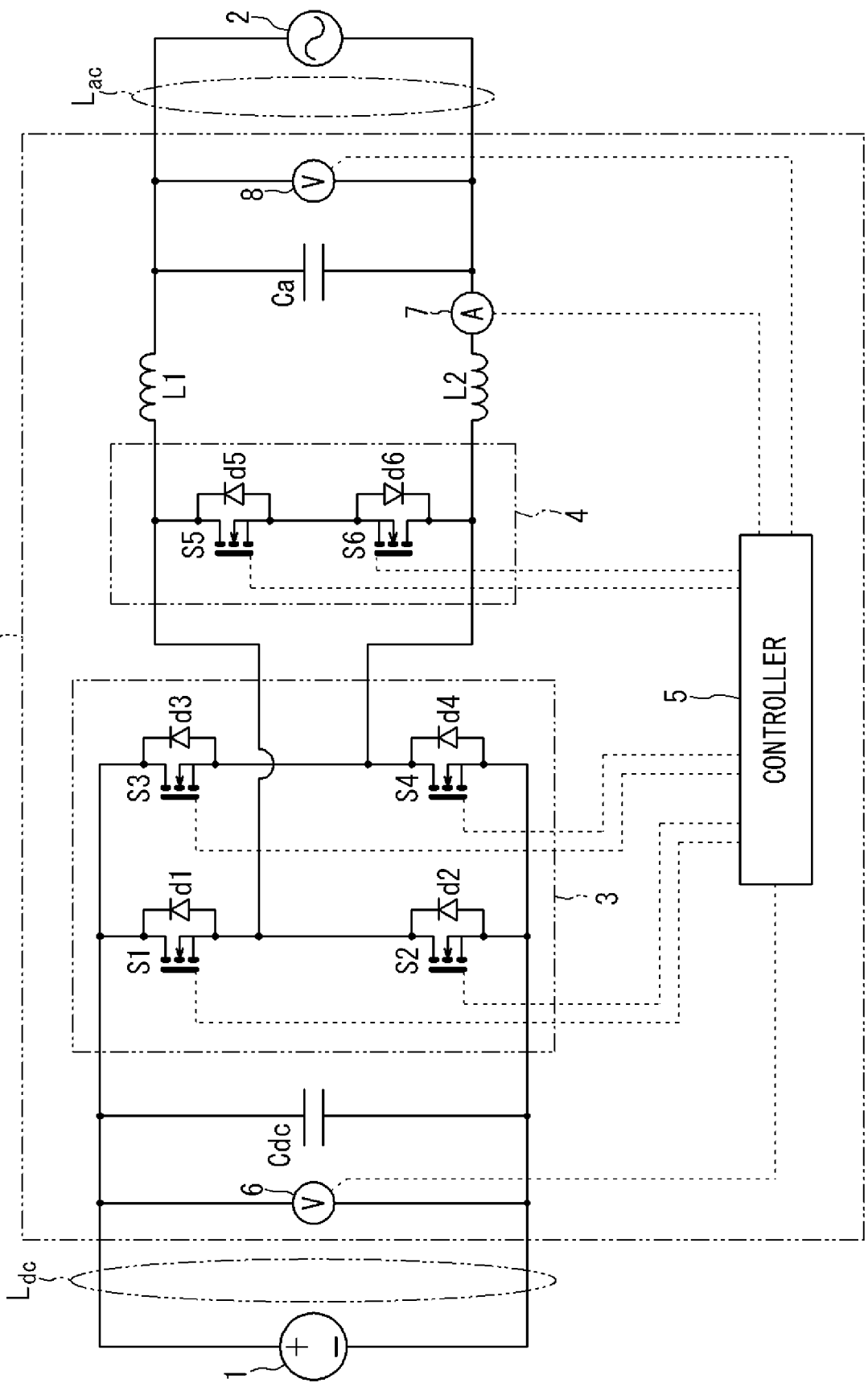
FIG. 1 is a circuit diagram showing an example of a HERIC power conversion device.

Problems to be Solved by the Present Disclosure

Each of the power conversion devices of PATENT LITERATURE 1 and PATENT LITERATURE 3 described above operates without any problem if the power factor on the AC side is 1, but there is a problem that, when there is a phase difference between an AC voltage and an AC current, the output of the full-bridge circuit is short-circuited by the short-circuit section.

In the power conversion device of PATENT LITERATURE 2, it is proposed that a dead time is provided for a switch of the short-circuit section such that, when the full-bridge circuit is performing switching and an output voltage is outputted, the output voltage is not short-circuited by the short-circuit section. However, according to the verification by simulation, in the power conversion device, distortion occurs in an output current near zero-cross points of an AC current and an AC voltage to be outputted to a load.

In the power conversion device of PATENT LITERATURE 4, short-circuiting the output of the full-bridge circuit by the short-circuit section can be avoided. However, for example, focusing on a first switch and a second switch that form one leg of the full-bridge circuit, control is included in which, from a state where a diode disposed in antiparallel to one switch is conductive, that is, a state where the voltage of a DC power supply is applied to the other switch as it is, the other switch becomes closed. For example, in the basic HERIC power conversion device disclosed in PATENT LITERATURE 1, the voltage applied to one switch of the full-bridge circuit is half the voltage of the DC power supply. Therefore, in the power conversion device of PATENT LITERATURE 4, the power loss associated with switching of each switch of the full-bridge circuit is doubled as compared with that in the basic HERIC power conversion device.

In the power conversion device of PATENT LITERATURE 5, the amplitude of a pulse voltage applied to both ends of an AC reactor is twice that of the voltage of a DC power supply. Therefore, the power loss (mainly iron loss) of the AC reactor is large. In addition, dead time compensation is complicated; for example, a long dead time is required between two types of gate drive signals for the full-bridge circuit.

Therefore, an object of the present invention is to provide a power conversion device that includes a short-circuit section and can be used without any problem even when there is a phase difference between an AC voltage and an AC current and in which power loss is suppressed and distortion of an AC current to be outputted is suppressed; and a control method therefor.

Effects of the Present Disclosure

According to the present disclosure, the power conversion device having the short-circuit section can be used without any problem even when there is a phase difference between the AC voltage and the AC current, power loss is suppressed, and distortion of an AC current to be outputted is suppressed.

Description of Embodiments of the Present Disclosure

A summary of embodiments of the present disclosure includes at least the following.

(1) This is a power conversion device provided between a DC electrical path and an AC electrical path and configured to perform conversion from DC to AC or vice versa, the power conversion device including: a full-bridge circuit configured by a first switch, a second switch, a third switch configured to operate in synchronization with the second switch, and a fourth switch configured to operate in synchronization with the first switch; a freewheeling diode provided along with the full-bridge circuit and being for passing a current in a forward direction thereof; an AC reactor existing between the full-bridge circuit and the AC electrical path; a short-circuit section provided between two lines on an AC side of the full-bridge circuit and including a fifth switch configured to open and close a current conduction path from a first line to a second line of the two lines, a sixth switch configured to open and close a current conduction path from the second line to the first line, a diode configured to block a current from the first line to the second line and existing in series with the sixth switch, and a diode configured to block a current from the second line to the first line and existing in series with the fifth switch; and a controller configured to control the full-bridge circuit and the short-circuit section.

When there is a phase difference between an AC voltage of the AC electrical path and an AC current flowing through the AC reactor, the controller performs control with one cycle divided into a total of four periods, that is, a first period in which both the AC voltage and the AC current are positive, a second period in which the AC voltage is positive and the AC current is negative, a third period in which both the AC voltage and the AC current are negative, and a fourth period in which the AC voltage is negative and the AC current is positive.

The controller executes, in the first period, a first control mode in which the first switch and the fourth switch are caused to perform switching operation, the second switch and the third switch are opened, and the sixth switch is closed; the controller executes, in the second period, a second control mode in which a current is passed through the freewheeling diode when the fifth switch is opened while the fifth switch is caused to perform switching operation; the controller executes, in the third period, a third control mode in which the second switch and the third switch are caused to perform switching operation, the first switch and the fourth switch are opened, and the fifth switch is closed; and the controller executes, in the fourth period, a fourth control mode in which a current is passed through the freewheeling diode when the sixth switch is opened while the sixth switch is caused to perform switching operation.

In the above power conversion device, even when there is a phase difference between the AC voltage and the AC current, appropriate control can be performed according to the difference between the signs of the AC voltage and the AC current. In addition, distortion of an AC current to be outputted is suppressed. Furthermore, when each switch of the full-bridge circuit is performing switching operation, the voltage of the DC electrical path is not applied to each switch as it is, and a voltage that is half the voltage of the DC electrical path is constantly applied thereto. Moreover, the amplitude of a pulse voltage generated between both ends of the AC reactor due to switching is equal to that of the voltage of the DC electrical path. Therefore, the power loss due to switching and the power loss due to the AC reactor are reduced. Thus, the power conversion device having the short-circuit section can be used without any problem even when there is a phase difference between the AC voltage and the AC current, power loss is suppressed, and distortion of an AC current to be outputted is suppressed.

(2) In the power conversion device of the above (1), the controller may delay stop of switching operation of the full-bridge circuit and may delay opening or stop of switching operation of a closed switch in the short-circuit section, from a moment at which the AC current having a ripple superimposed therein reaches a zero-cross point.

In this case, considering that the sign of the AC current fluctuates near a zero-cross point due to the amplitude of a ripple included in the AC current flowing through the AC reactor, the control mode can be changed after the sign is completely changed.

(3) In the power conversion device of the above (1) or (2), for each of the freewheeling diode and the diodes in the short-circuit section, the controller may provide a dead time that is a predetermined period, at each of the beginning and the end of a period in which a current flows through the diode, and may close a switch existing in parallel with the diode.

In the case where the switches existing in parallel with the diodes are MOSFETs (Metal-Oxide-Semiconductor Field-Effective Transistors), by closing the switches, the conduction resistance and the conduction loss can be reduced as compared with those in the case where a current is passed through only the diodes.

Moreover, since the dead time is provided within the period in which the current flows through the freewheeling diode, distortion of the AC current is suppressed. Thus, it is not necessary to perform dead time compensation for suppressing current distortion.

(4) In the power conversion device of any one of the above (1) to (3), a DC/DC converter may be provided on a DC side of the full-bridge circuit; the controller may compare a DC voltage on a low voltage side of the DC/DC converter and the absolute value of a voltage target value on the AC side of the full-bridge circuit with each other;

when the DC voltage is lower, the controller may operate the DC/DC converter and stops switching operation of the full-bridge circuit with performing only necessary polarity inversion; and when the absolute value of the voltage target value is lower, the controller may stop switching operation of the DC/DC converter and cause the full-bridge circuit to perform switching operation.

In this case, a switching pause period of the DC/DC converter and a switching pause period of the full-bridge circuit can be alternately provided every half cycle of alternating current, so that power loss can be reduced due to a reduction in the total number of times of switching.

(5) In the power conversion device of the above (1), the controller may complementarily close the first switch and the fifth switch when both the first switch and the fifth switch perform switching operation, and may complementarily close the second switch and the sixth switch when both the second switch and the sixth switch perform switching operation.

In this case, the fifth switch is opened when a pair of the first switch and the fourth switch are closed, and the pair of the first switch and the fourth switch are opened when the fifth switch is closed. The sixth switch is opened when a pair of the second switch and the third switch are closed, and the pair of the second switch and the third switch are opened when the sixth switch is closed. Therefore, short-circuiting of the DC electrical path can be suppressed.

(6) Meanwhile, this is a control method for a power conversion device provided between a DC electrical path and an AC electrical path and including a full-bridge circuit configured by switches and a freewheeling diode and a short-circuit section and an AC reactor connected on an AC side of the full-bridge circuit, the control method being executed by a controller, the control method including: when there is a phase difference between an AC voltage of the AC electrical path and an AC current flowing through the AC reactor, performing control with one cycle divided into a total of four periods, that is, a first period in which both the AC voltage and the AC current are positive, a second period in which the AC voltage is positive and the AC current is negative, a third period in which both the AC voltage and the AC current are negative, and a fourth period in which the AC voltage is negative and the AC current is positive; executing, in the first period, control that alternately has a powering period in which the full-bridge circuit is caused to perform switching operation and a current is passed through the full-bridge circuit in a positive direction and a freewheeling period in which a current is passed through the short-circuit section in the positive direction in a state where all the switches of the full-bridge circuit are opened; executing, in the second period, control that alternately has a powering period in which the short-circuit section is caused to perform switching operation and a current is passed through the short-circuit section in a negative direction and a freewheeling period in which a current is passed through the freewheeling diode of the full-bridge circuit in the negative direction in a state where all the switches are opened; executing, in the third period, control that alternately has a powering period in which the full-bridge circuit is caused to perform switching operation and a current is passed through the full-bridge circuit in the negative direction and a freewheeling period in which a current is passed through the short-circuit section in the negative direction in a state where all the switches of the full-bridge circuit are opened; and executing, in the fourth period, control that alternately has a powering period in which the short-circuit section is caused to perform switching operation and a current is passed through the short-circuit section in the positive direction and a freewheeling period in which a current is passed through the freewheeling diode of the full-bridge circuit in the positive direction in a state where all the switches are opened.

With the above control method for the power conversion device, even when there is a phase difference between the AC voltage and the AC current, appropriate control can be performed according to the difference between the signs of the AC voltage and the AC current. In addition, distortion of an AC current to be outputted is suppressed. Furthermore, when each switch of the full-bridge circuit is performing switching operation, the voltage of the DC electrical path is not applied to each switch as it is, and a voltage that is half the voltage of the DC electrical path is constantly applied thereto. Moreover, the amplitude of a pulse voltage generated between both ends of the AC reactor due to switching is equal to that of the voltage of the DC electrical path. Therefore, the power loss due to switching and the power loss due to the AC reactor are reduced. Thus, the power conversion device having the short-circuit section can be used without any problem even when there is a phase difference between the AC voltage and the AC current, power loss is suppressed, and distortion of an AC current to be outputted is suppressed.

Details of Embodiments of the Present Disclosure

<<Circuit Configuration>>

Hereinafter, a power conversion device according to an embodiment of the present disclosure will be described with reference to the drawings.

FIG. 1 is a circuit diagram showing an example of a HERIC power conversion device. In the drawing, a power conversion device (inverter) 10 existing between a DC power supply 1 and a commercial power grid 2 includes a DC side capacitor Cdc, a full-bridge circuit 3, a short-circuit section 4, AC reactors L1 and L2, and an AC side capacitor Ca. Such a power conversion device 10 can perform conversion from AC to DC as well as conversion from DC to AC. Here, the power conversion device 10 will be described on the assumption of conversion from DC to AC.

The DC side capacitor Cdc is connected to both ends of the DC power supply 1. The full-bridge circuit 3 is configured by connecting a first switch S1, a second switch S2, a third switch S3, and a fourth switch S4, which are, for example, MOSFETs, in a full-bridge form as shown in the drawing. The respective switches S1, S2, S3, and S4 have freewheeling diodes (body diodes) d1, d2, d3, and d4 in antiparallel, respectively. The full-bridge circuit 3 converts a DC voltage inputted from two lines of a DC electrical path $L_{dc}$ to an AC voltage.

The short-circuit section 4 is connected to two lines on the AC side of the full-bridge circuit 3. The short-circuit section 4 includes a series unit of a fifth switch S5 and a sixth switch S6 provided between the two lines on the AC side of the full-bridge circuit 3. The fifth switch S5 and the sixth switch S6 are connected in series so as to have polarities opposite to each other. The fifth switch S5 and the sixth switch S6 are, for example, MOSFETs, and have diodes (body diodes) d5 and d6 in antiparallel, respectively. The AC reactors L1 and L2 exist in series with respect to a current path flowing from the full-bridge circuit 3 to two lines of an AC electrical path $L_{ac}$. The AC side capacitor Ca is connected between two lines of the AC electrical path $L_{ac}$. The short-circuit section 4, together with the AC reactors L1 and L2, forms a freewheeling circuit.

The switches S5 and S6 may have a shown connection form in which the anodes of the diodes d5 and d6 are connected to each other, or a connection form in which the cathodes of the diodes d5 and d6 are connected to each other. In the latter case, the lower element of the switch series unit (S5, S6) is the switch S5, and the upper element thereof is the switch S6. In addition, instead of the form of the switch series unit (S5, S6), a short-circuit section having a circuit configuration in which a series unit of the switch S5 and the diode d6 and a series unit of the switch S6 and the diode d5 are connected in parallel with each other between the two lines on the AC side of the full-bridge circuit 3 may be provided.

A more universal expression of the short-circuit section 4 is as follows, for example. The short-circuit section 4 is provided between the two lines on the AC side of the full-bridge circuit 3, and includes the fifth switch S5 which opens and closes a current conduction path from a first line to a second line of the two lines, the sixth switch S6 which opens and closes a current conduction path from the second line to the first line, the diode d5 which blocks a current from the first line to the second line and exists in series with the sixth switch, and the diode d6 which blocks a current from the second line to the first line and exists in series with the fifth switch.

In the above example, the first switch S1, the second switch S2, the third switch S3, the fourth switch S4, the fifth switch S5, and the sixth switch S6 are all MOSFETs, but instead of this, IGBTs (Insulated Gate Bipolar Transistors), and freewheeling diodes that are antiparallel to the respective IGBTs may be used. In addition, there may be a case where four freewheeling diodes provided along with the full-bridge circuit 3 do not simply exist in antiparallel to the first switch S1, the second switch S2, the third switch S3, and the fourth switch S4, respectively. For example, in the full-bridge circuit of a circuit known as "H6.5 inverter", there is also a circuit configuration in which a common diode exists in antiparallel to each of the first switch S1 and the third switch S3 via a switch. From the viewpoint of freewheeling, the diodes are each an element that is provided along with the full-bridge circuit 3 and is for passing a current in the forward direction thereof (to the positive side of the DC electrical path $L_{dc}$).

A voltage sensor 6 is connected in parallel with the DC power supply 1 and the DC side capacitor Cdc. The voltage sensor 6 detects the voltage between the two lines of the DC electrical path $L_{dc}$ and sends the detection output to a controller 5. A current sensor 7 is connected in series with the AC reactor L2. The current sensor 7 detects the current flowing through the AC reactors L1 and L2 and sends the detection output to the controller 5. A voltage sensor 8 is connected between the two lines of the AC electrical path $L_{ac}$. The voltage sensor 8 detects the voltage of the commercial power grid 2 and sends the detection output to the controller 5.

The controller 5 includes, for example, a computer, and the computer executes software (computer program), thereby realizing necessary control functions. The software is stored in a storage device (not shown) of the controller 5.

<<Example of AC Voltage and AC Current>>

Figure 2:
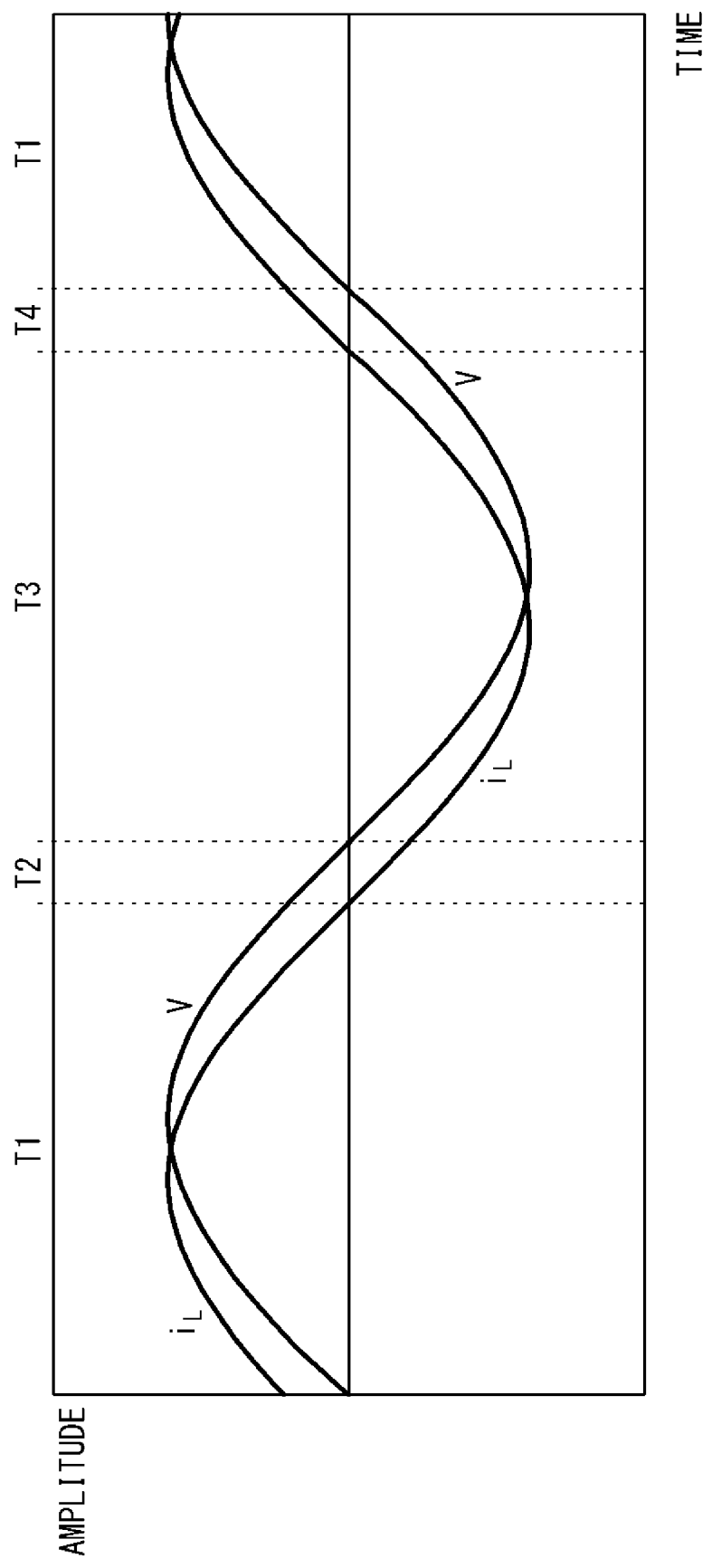
FIG. 2 is an example of a waveform diagram when there is a phase difference between an AC voltage V of an AC electrical path and an AC current $i_L$ flowing through an AC reactor.

FIG. 2 is an example of a waveform diagram when there is a phase difference between an AC voltage V of the AC electrical path $L_{ac}$ and an AC current $i_L$ flowing through the AC reactor L1, L2. For simplification, the amplitudes are set to the same level. In this case, there are periods in which the signs (positive or negative) of the AC voltage V and the AC current $i_L$ match each other, and there are periods in which the signs (positive or negative) of the AC voltage V and the AC current $i_L$ are different from each other.

Specifically, within one cycle, there are a total of four periods, that is, a first period T1 in which both the AC voltage and the AC current are positive, a second period T2 in which the AC voltage is positive and the AC current is negative, a third period T3 in which both the AC voltage and the AC current are negative, and a fourth period T4 in which the AC voltage is negative and the AC current is positive. Therefore, the controller 5 performs control with one cycle divided into a total of four periods, that is, the first period T1, the second period T2, the third period T3, and the fourth period T4.

<<Circuit Operation and Current Flow>>

Hereinafter, circuit operation and current flow of the power conversion device 10 will be described.

FIG. 3 to FIG. 10 are diagrams in which a path through which a current flows is added to FIG. 1 with thick lines in each case. As for the direction of current, a current flowing through the AC reactor L1 toward the AC electrical path $L_{ac}$ is defined as a positive current, and a current flowing in the direction opposite thereto is defined as a negative current. The reference signs of the elements that are closed (including closed during switching operation) or conductive are marked with circles.

(First Control Mode in First Period T1)

Figure 3:
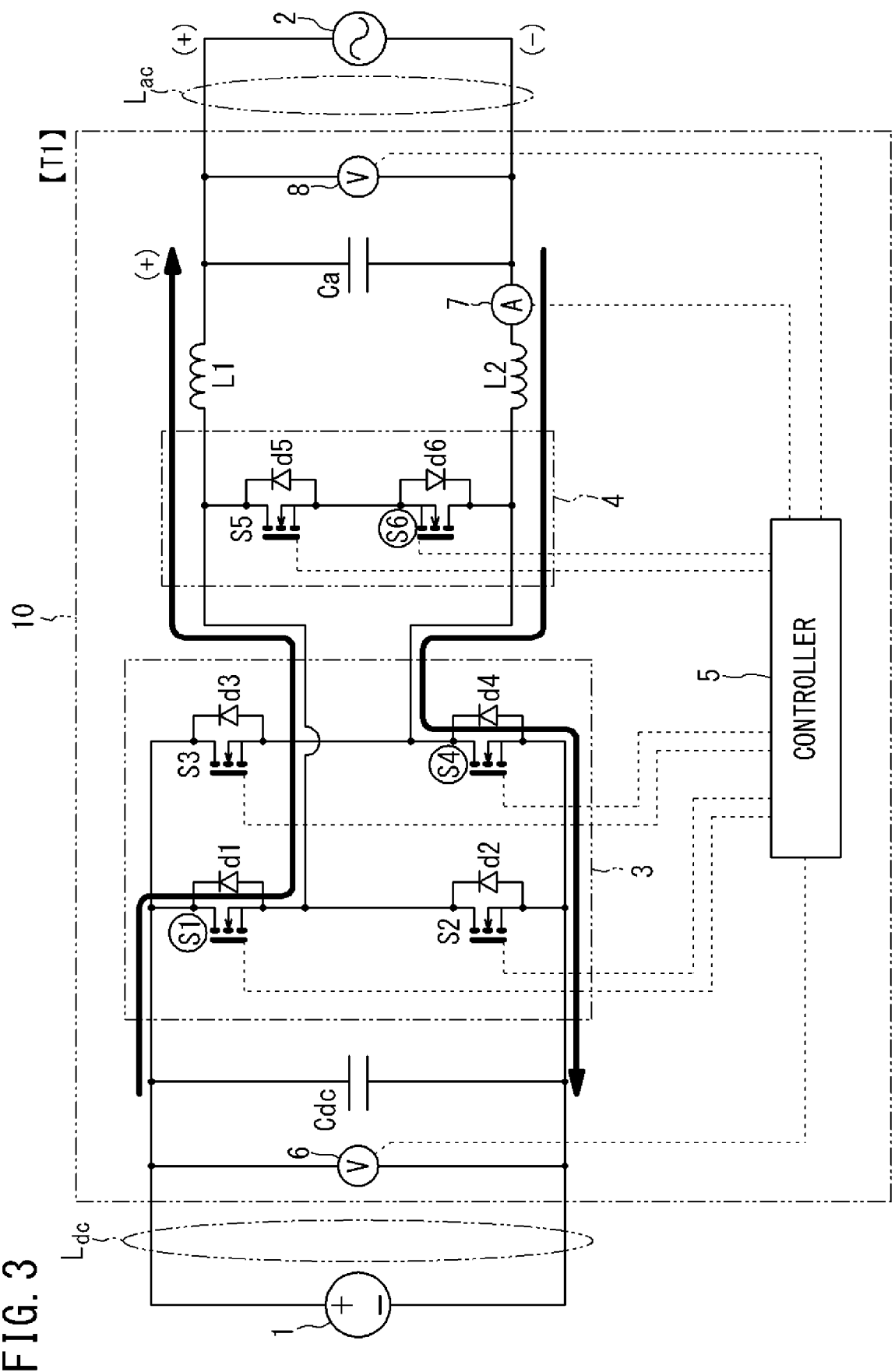
FIG. 3 is a diagram in which a path through which a current flows in a first period is added to FIG. 1 with thick lines.

First, in FIG. 3 (positive current powering), a pair of the first switch S1 and the fourth switch S4 perform switching operation in synchronization with each other, and are closed at the present time. A pair of the second switch S2 and the third switch S3 are opened. The fifth switch S5 is opened, and the sixth switch S6 is closed. In this state, a current path can be created so as to extend from the positive side of the DC electrical path $L_{dc}$ through the first switch S1 and the AC reactor L1 to one line (upper) of the AC electrical path $L_{ac}$, and a current path can also be created so as to extend from the other line (lower) of the AC electrical path $L_{ac}$ through the AC reactor L2 and the switch S4 to the negative side of the DC electrical path $L_{dc}$.

Figure 4:
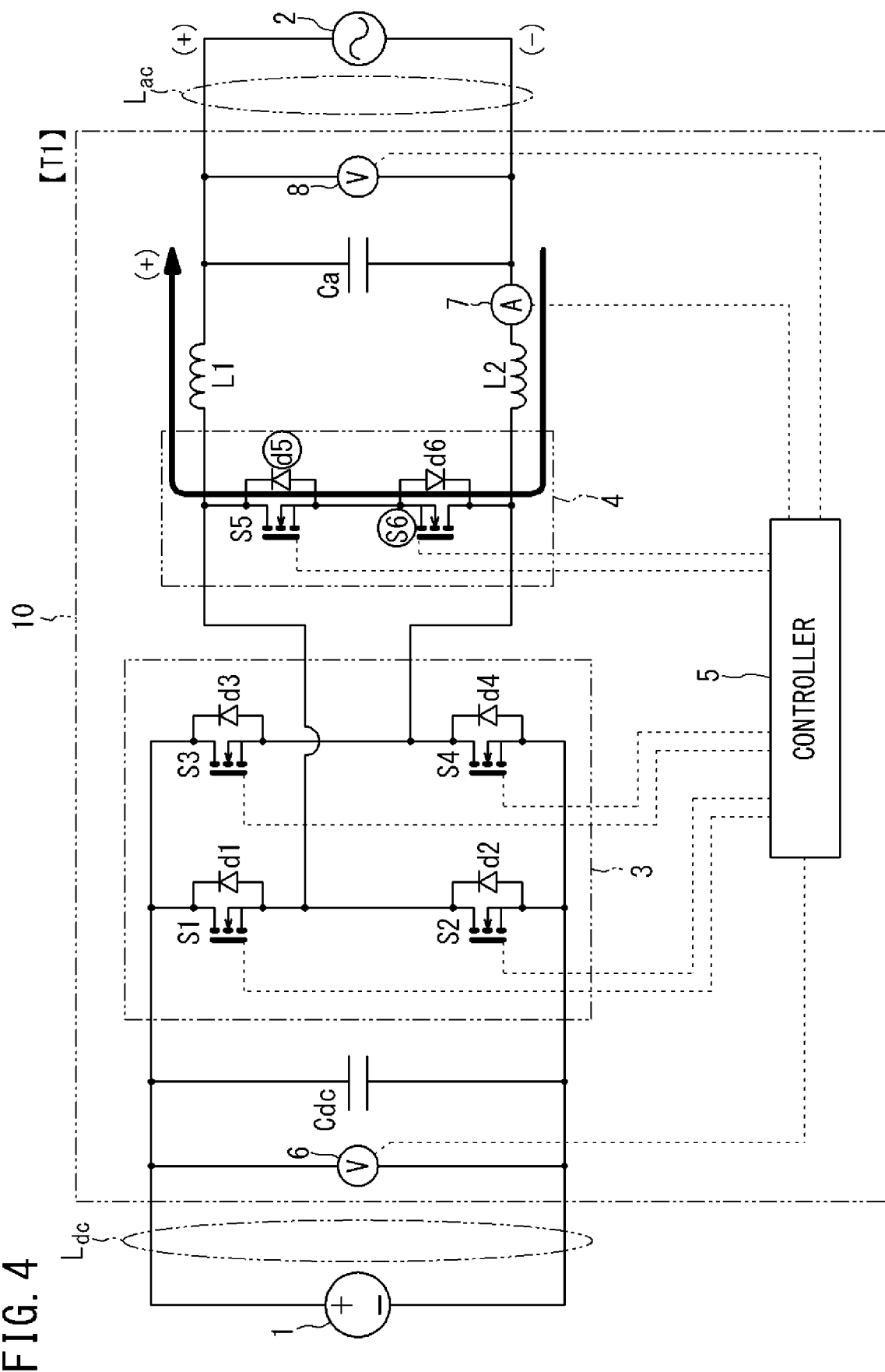
FIG. 4 is a diagram in which a path through which a current flows in the first period is added to FIG. 1 with a thick line.

On the other hand, in FIG. 4 (positive freewheeling), the pair of the first switch S1 and the fourth switch S4 that are performing switching operation are opened at the present time. The pair of the second switch S2 and the third switch S3 are opened. Therefore, all the switches S1 to S4 of the full-bridge circuit 3 become opened. The fifth switch S5 is opened, and the sixth switch S6 is closed. In this state, a current path can be created so as to extend from the AC reactor L2 through the closed switch S6, the diode d5, and the AC reactor L1.

In the first period T1, state transition occurs alternately between the state of FIG. 3 and the state of FIG. 4.

(Second Control Mode in Second Period T2)

Figure 5:
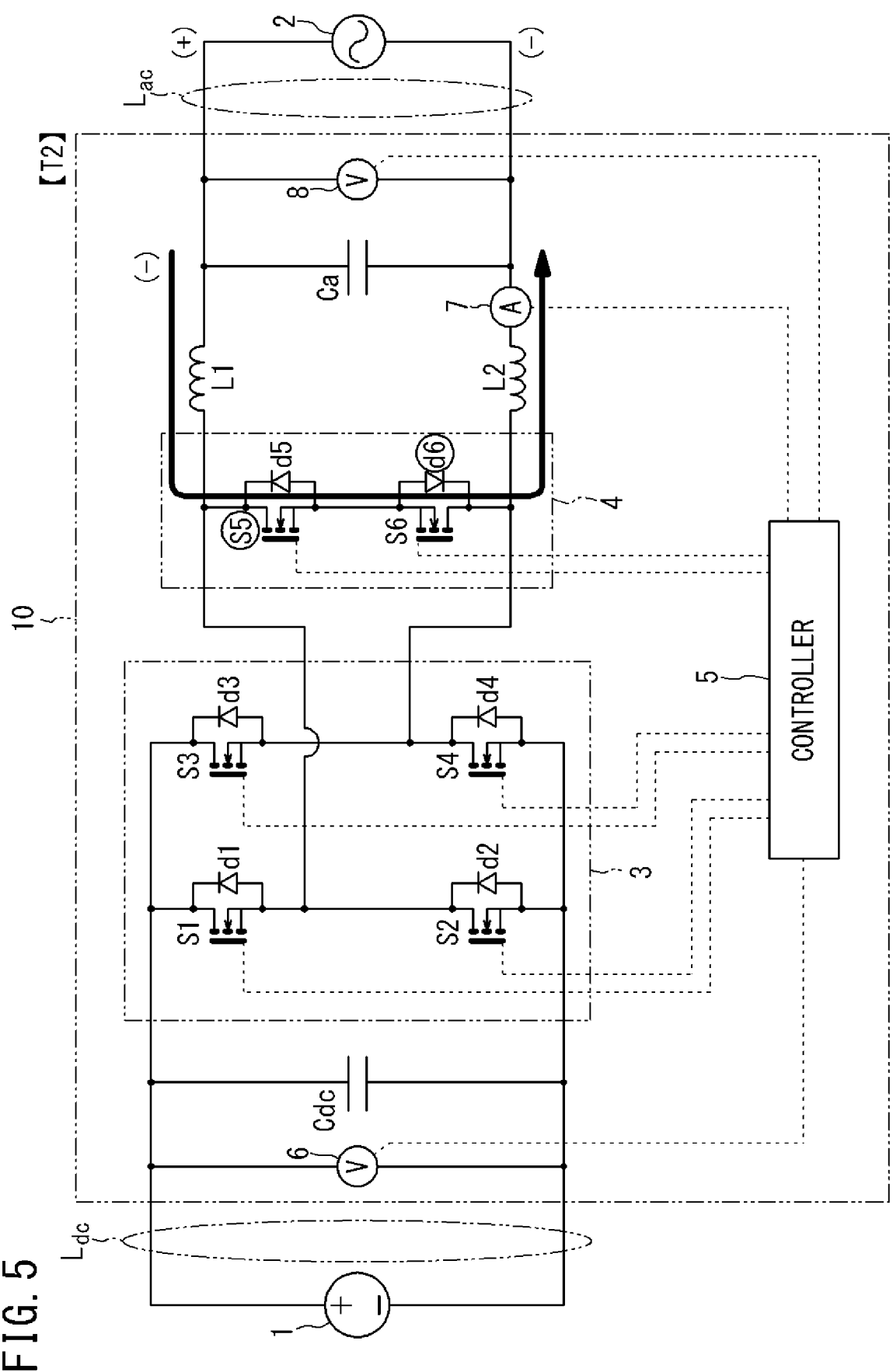
FIG. 5 is a diagram in which a path through which a current flows in a second period is added to FIG. 1 with a thick line.

Next, in FIG. 5 (negative current powering), the fifth switch S5 performs switching operation, and is closed at the present time. The first switch S1, the second switch S2, the third switch S3, the fourth switch S4, and the sixth switch S6 are opened. In this state, a current path can be created so as to extend from the AC reactor L1 through the closed switch S5, the diode d6, and the AC reactor L2.

Figure 6:
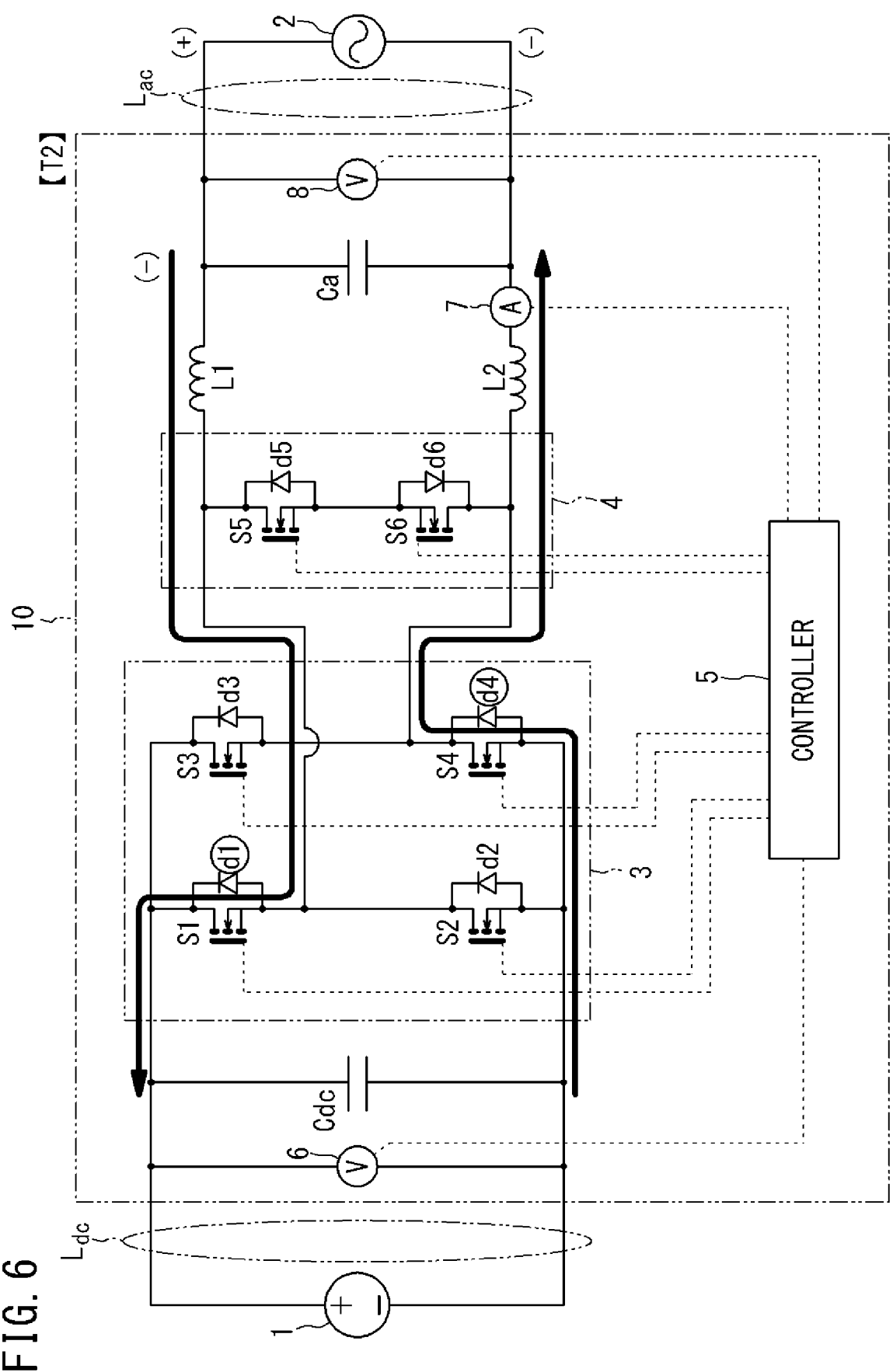
FIG. 6 is a diagram in which a path through which a current flows in the second period is added to FIG. 1 with thick lines.

On the other hand, in FIG. 6 (negative freewheeling), the fifth switch S5 that is performing switching operation is opened at the present time. The first switch S1, the second switch S2, the third switch S3, the fourth switch S4, and the sixth switch S6 are opened. In this state, a current path can be created so as to extend from the AC reactor L1 through the freewheeling diode d1 of the full-bridge circuit 3 to the positive side of the DC electrical path $L_{dc}$. In addition, a current path can be created so as to extend from the negative side of the DC electrical path $L_{dc}$ through the freewheeling diode d4 to the AC reactor L2.

In the second period T2, state transition occurs alternately between the state of FIG. 5 and the state of FIG. 6.

(Third Control Mode in Third Period T3)

Figure 7:
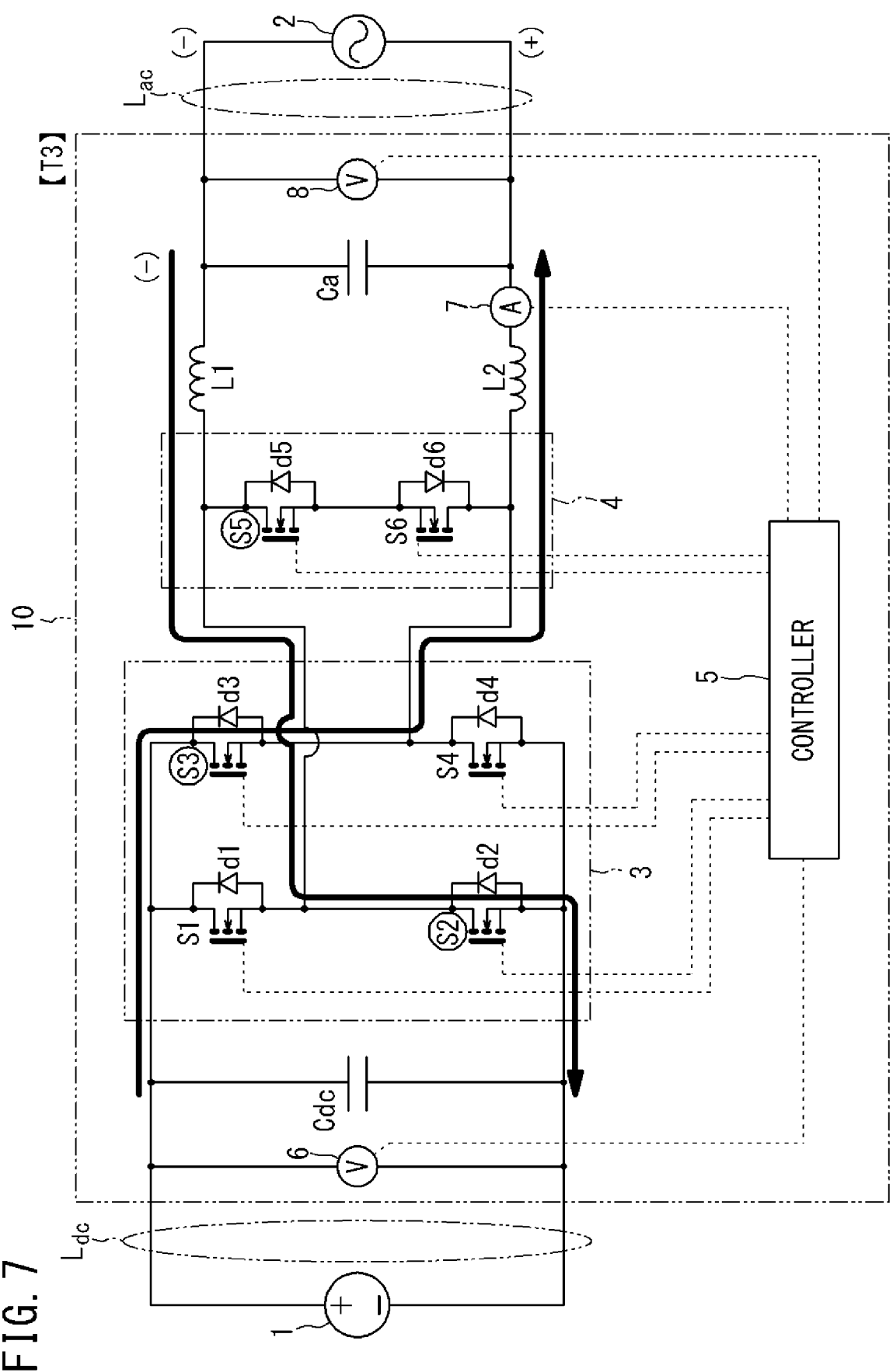
FIG. 7 is a diagram in which a path through which a current flows in a third period is added to FIG. 1 with thick lines.

Next, in FIG. 7 (negative current powering), the pair of the second switch S2 and the third switch S3 perform switching operation in synchronization with each other, and are closed at the present time. The pair of the first switch S1 and the fourth switch S4 are opened. The fifth switch S5 is closed, and the sixth switch S6 is opened. In this state, a current path can be created so as to extend from the positive side of the DC electrical path $L_{dc}$ through the third switch S3 and the AC reactor L2 to the other line (lower) of the AC electrical path $L_{ac}$, and a current path can also be created so as to extend from the one line (upper) of the AC electrical path $L_{ac}$ through the AC reactor L1 and the switch S2 to the negative side of the DC electrical path $L_{dc}$.

Figure 8:
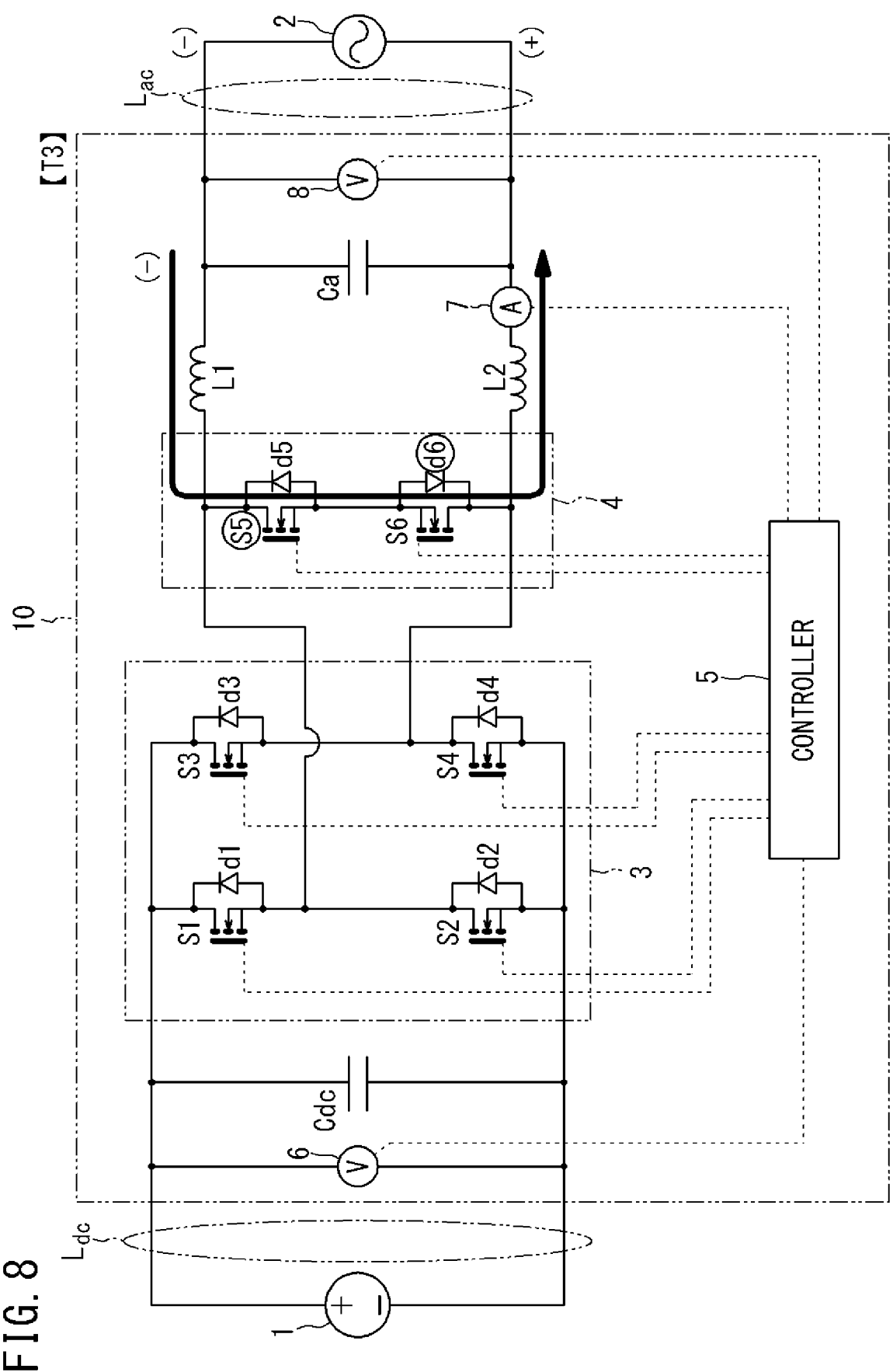
FIG. 8 is a diagram in which a path through which a current flows in the third period is added to FIG. 1 with a thick line.

On the other hand, in FIG. 8 (negative freewheeling), the pair of the second switch S2 and the third switch S3 that are performing switching operation are opened at the present time. The pair of the first switch S1 and the fourth switch S4 are opened. Therefore, all the switches S1 to S4 of the full-bridge circuit 3 become opened. The fifth switch S5 is closed, and the sixth switch S6 is opened. In this state, a current path can be created so as to extend from the AC reactor L1 through the closed switch S5, the diode d6, and the AC reactor L2.

In the third period T3, state transition occurs alternately between the state of FIG. 7 and the state of FIG. 8.

(Fourth Control Mode in Fourth Period T4)

Figure 9:
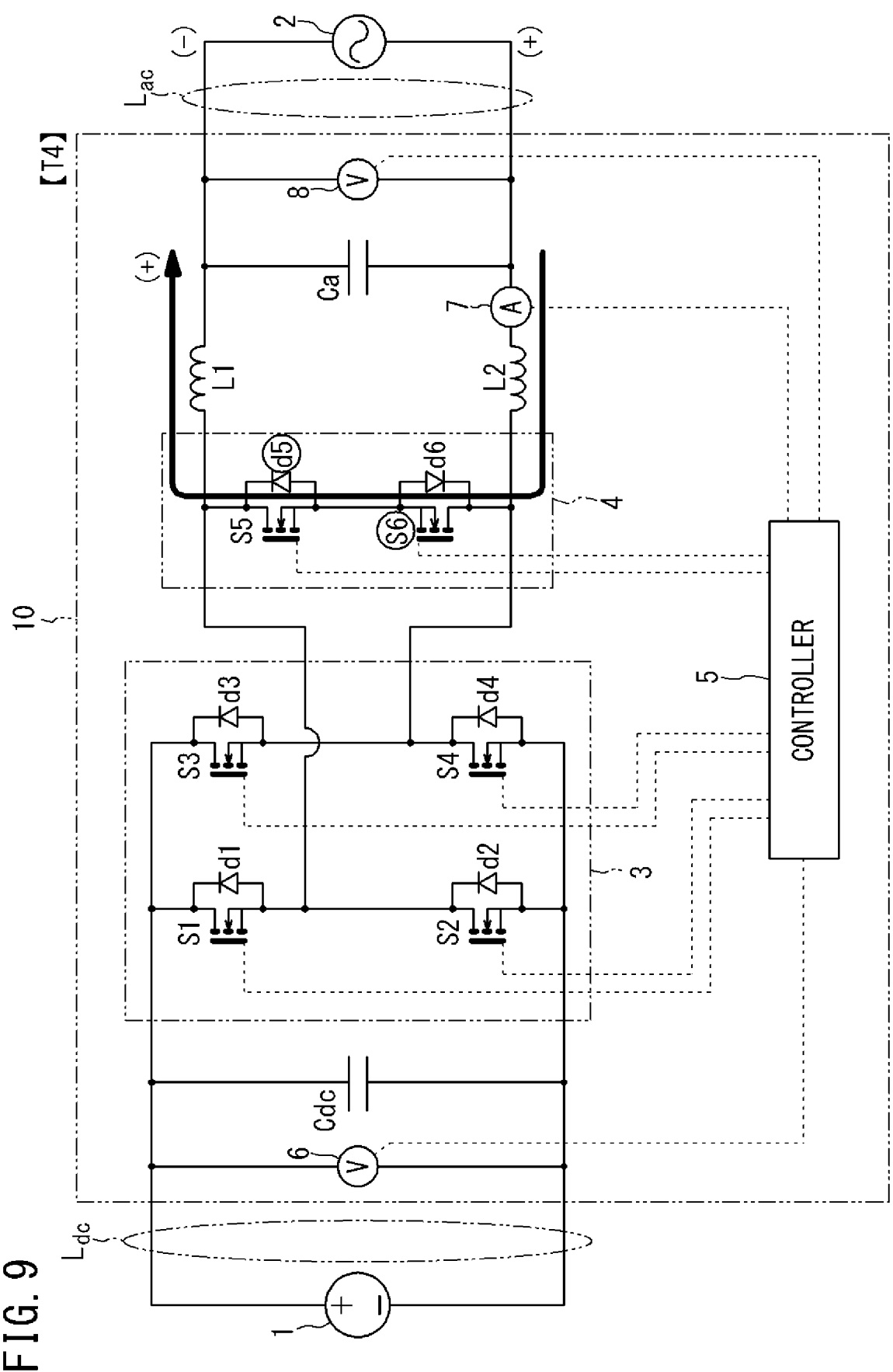
FIG. 9 is a diagram in which a path through which a current flows in a fourth period is added to FIG. 1 with a thick line.

Next, in FIG. 9 (positive current powering), the sixth switch S6 performs switching operation, and is closed at the present time. The first switch S1, the second switch S2, the third switch S3, the fourth switch S4, and the fifth switch S5 are opened. In this state, a current path can be created so as to extend from the AC reactor L2 through the closed switch S6, the diode d5, and the AC reactor L1.

Figure 10:
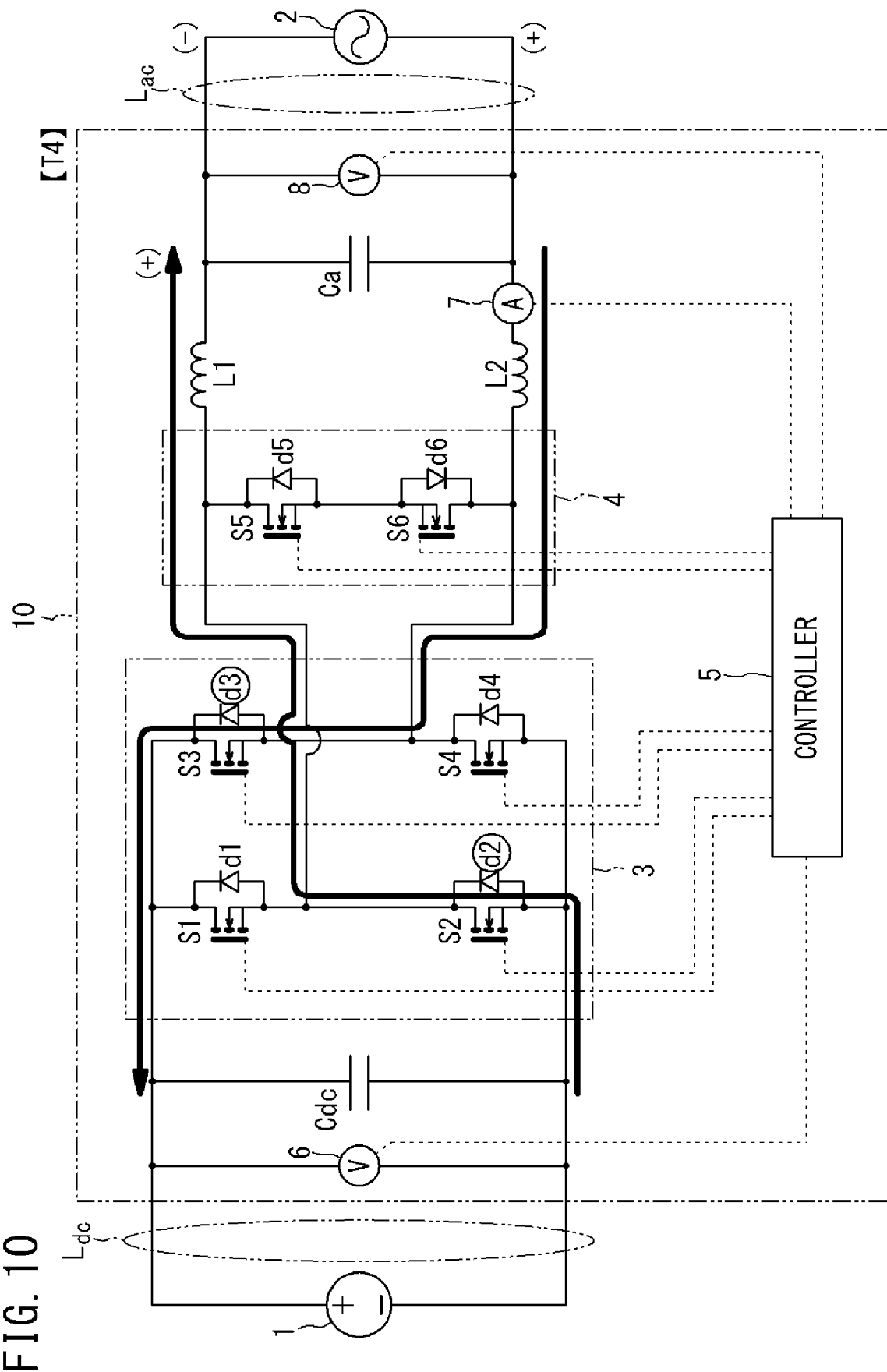
FIG. 10 is a diagram in which a path through which a current flows in the fourth period is added to FIG. 1 with thick lines.

On the other hand, in FIG. 10 (positive freewheeling), the sixth switch S6 that is performing switching operation is opened at the present time. The first switch S1, the second switch S2, the third switch S3, the fourth switch S4, and the fifth switch S5 are opened. In this state, a current path can be created so as to extend from the AC reactor L2 through the freewheeling diode d3 of the full-bridge circuit 3 to the positive side of the DC electrical path $L_{dc}$. In addition, a current path can be created so as to extend from the negative side of the DC electrical path $L_{dc}$ through the freewheeling diode d2 to the AC reactor L1.

In the fourth period T4, state transition occurs alternately between the state of FIG. 9 and the state of FIG. 10.

In the above power conversion device 10, even when there is a phase difference between the AC voltage and the AC current in the HERIC circuit configuration, appropriate control can be performed according to the difference between the signs of the AC voltage and the AC current. In addition, distortion of an AC current to be outputted is suppressed. Furthermore, the voltage of the DC electrical path is not applied to each of the switches S1 to S4 of the full-bridge circuit 3 during switching operation as it is, and a voltage that is half the voltage of the DC electrical path $L_{dc}$ is constantly applied thereto. Moreover, the amplitude of a pulse voltage generated between both ends of the AC reactors L1 and L2 is equal to that of the voltage of the DC electrical path. Therefore, the power loss due to switching and the power loss due to the AC reactors L1 and L2 are reduced. Thus, the HERIC power conversion device 10 can be used without any problem even when there is a phase difference between the AC voltage and the AC current, power loss is suppressed, and distortion of an AC current to be outputted is suppressed.

<<Generation of Gate Signal: First Example>>

Next, a first example of generation of a gate signal will be described. There are four types of gate signals, that is, a gate signal G1 for operating the pair of the first switch S1 and the fourth switch S4, a gate signal G2 for operating the pair of the second switch S2 and the third switch S3, a gate signal G5 for operating the fifth switch S5, and a gate signal G6 for operating the sixth switch S6.

When a voltage reference value of the AC voltage is denoted by $V_{inv\_ref}$, the gate signal G1 is obtained by performing further processing on a signal, which is obtained by comparing the voltage reference value $V_{inv\_ref}$ and a carrier signal (high frequency triangular wave) with each other, such that the switch S1 and the switch S4 are constantly opened when the current flowing through the AC reactor is negative. In addition, the gate signal G2 is obtained by performing the same processing on a signal obtained by comparing $(-V_{inv\_ref})$ obtained by inverting the voltage reference value $V_{inv\_ref}$ and the carrier signal with each other. Therefore, the gate signals G1 and G2 are PWM (Pulse Width Modulation) signals that appear alternately every half cycle of alternating current.

Meanwhile, the gate signal G5 is obtained by comparing the voltage reference value $V_{inv\_ref}$ and the carrier signal with each other, and is calculated such that the logic thereof is opposite to that of the gate signal G1. Furthermore, when the sign of a current target value of the AC current flowing through the AC reactor becomes positive, the gate signal G5 is fixed such that the fifth switch S5 is constantly opened.

Moreover, the gate signal G6 is obtained by comparing the inverted voltage reference value $(-V_{inv\_ref})$ and the carrier signal with each other, and is calculated such that the logic thereof is opposite to that of the gate signal G2. Furthermore, when the sign of the AC current flowing through the AC reactor becomes negative, the gate signal G6 is fixed such that the sixth switch S6 is constantly opened.

The AC current flowing through the AC reactor actually includes a ripple. When the AC current including the ripple passes through a zero-cross point, the sign of the AC current continually changes between positive and negative due to the influence of the amplitude of the ripple. Therefore, a period of switching operation with one of the gate signals G1 and G2 with which switching operation is performed, including a period when the AC current including the ripple passes through a zero-cross point, is extended. In addition, an ON-period for one of the gate signals G5 and G6 that is turned on (switch closing) is extended.

As described above, occurrence of distortion due to the current being discontinuous near a zero-cross point by the amplitude of the ripple included in the AC current can be suppressed.

<<Generation of Gate Signal: Second Example>>

Next, a second example of generation of a gate signal will be described. Similar to the first example, there are four types of gate signals.

When the voltage reference value of the AC voltage is denoted by $V_{inv\_ref}$, the gate signal G1 is obtained by comparing the voltage reference value $V_{inv\_ref}$ and the carrier signal with each other. In addition, the gate signal G2 is obtained by comparing $(-V_{inv\_ref})$ obtained by inverting the voltage reference value $V_{inv\_ref}$ and the carrier signal with each other. Therefore, the gate signals G1 and G2 are PWM signals that appear alternately every half cycle of alternating current.

However, conditions are weighted in the generation of the gate signals G1 and G2. When the signs of an AC current target value and an AC voltage target value are the same, the carrier signal is used as it is, but when the signs of the AC current target value and the AC voltage target value are different from each other, an offset value is added to the carrier signal. Accordingly, the initial and final periods of one pulse width of each of the gate signals G1 and G2 are slightly cut off, and dead times can be created. For example, in FIG. 6, the freewheeling diodes d1 and d4 are constantly conductive in one pulse, and the first switch S1 and the fourth switch S4 are closed during the period in one pulse excluding the initial dead time and the final dead time. In addition, in FIG. 10, the freewheeling diodes d2 and d3 are constantly conductive in one pulse, and the second switch S2 and third switch S3 are closed during the period in one pulse excluding the initial dead time and the final dead time.

Accordingly, in the case where the switches existing in parallel with the freewheeling diodes d1, d2, d3, and d4 are MOSFETs, by closing the switches, the conduction resistance and the conduction loss can be reduced as compared with those in the case where a current is passed through only the diodes.

Meanwhile, the gate signal G5 is obtained by comparing the voltage reference value $V_{inv\_ref}$ and the carrier signal with each other, and is calculated such that the logic thereof is opposite to that of the gate signal G1. As a result, while switching is performed with the gate signal G5, the gate signal G5 has a complementary relationship with the gate signal G1.

Moreover, the gate signal G6 is obtained by comparing the inverted voltage reference value $(-V_{inv\_ref})$ and the carrier signal with each other, and is calculated such that the logic thereof is opposite to that of the gate signal G2. As a result, while switching is performed with the gate signal G6, the gate signal G6 has a complementary relationship with the gate signal G2.

However, a condition is weighted on the voltage reference value $V_{inv\_ref}$ in the generation of the gate signals G5 and G6. When the signs of the AC current target value and the AC voltage target value are different from each other, the voltage reference value $V_{inv\_ref}$ is used as it is, but when the signs of the AC current target value and the AC voltage target value are the same, an offset value is added to the voltage reference value $V_{inv\_ref}$. Accordingly, the initial and final periods of one pulse width of each of the gate signals G5 and G6 are slightly cut off, and dead times can be created.

For example, in FIG. 4 and FIG. 9, the diode d5 is constantly conductive in one pulse, and the fifth switch S5 is closed during the period in one pulse excluding the initial dead time and the final dead time. In FIG. 5 and FIG. 8, the diode d6 is constantly conductive in one pulse, and the sixth switch S6 is closed during the period in one pulse excluding the initial dead time and the final dead time.

Accordingly, in the case where the switches existing in parallel with the diodes d5 and d6 are MOSFETs, by closing the switches, the conduction resistance and the conduction loss can be reduced as compared with those in the case where a current is passed through only the diodes.

Similar to the first example, the AC current flowing through the AC reactor actually includes a ripple. When the AC current including the ripple passes through a zero-cross point, the sign of the AC current continually changes between positive and negative due to the influence of the amplitude of the ripple. Therefore, a period of switching operation with one of the gate signals G1 and G2 with which switching operation is performed, including a period when the AC current including the ripple passes through a zero-cross point, is extended. In addition, a period of switching operation with one of the gate signals G5 and G6 with which switching operation is performed is extended.

As described above, occurrence of distortion due to the current being discontinuous near a zero-cross point by the amplitude of the ripple included in the AC current can be suppressed.

<<Verification>>

Figure 11:
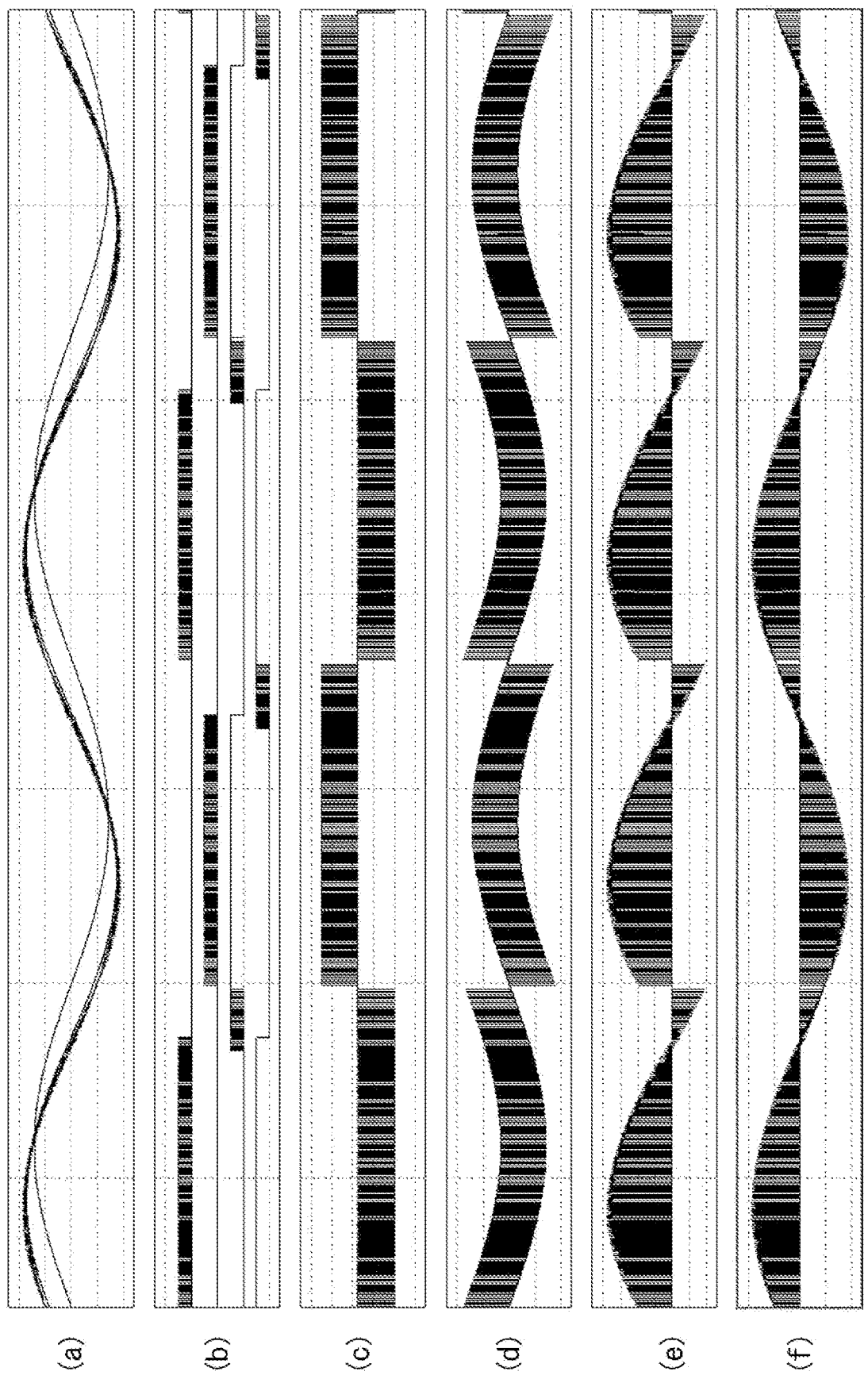
FIG. 11 shows waveform diagrams when conversion from DC to AC is performed with an output of 5 kVA and a power factor of 0.85 using gate signals of a first example in the power conversion device.

FIG. 11 shows waveform diagrams when conversion from DC to AC is performed with an output of 5 kVA and a power factor of 0.85 using the gate signals of the above first example in the power conversion device 10. From the top of the figure, (a) is a waveform diagram showing the AC voltage of the AC electrical path $L_{ac}$ and the AC current flowing through the AC reactor L1, L2. A line that looks thick indicates the AC current, and a line that looks thin indicates the AC voltage.

In FIG. 11, (b) shows the gate signals, and the gate signals are the gate signals G1, G2, G5, and G6 in this order from the top.

The signal operation will be described with three types, that is, ON (switch closing), OFF (switch opening), and switching operation. The gate signals G1 and G2 are repeatedly switched alternately between switching operation and OFF via periods in which both the gate signals G1 and G2 are turned off (switching operation stop). The gate signals G5 and G6 are repeatedly switched alternately between ON (H level) and OFF (L level), and when the gate signals G5 and G6 are turned on from off, switching operation is initially performed for a certain period of time. It should be noted that the switching operation with gate signal G5 is performed complementarily with the switching operation with the gate signal G1, and the switching operation with the gate signal G6 is performed complementarily with the switching operation with the gate signal G2.

For example, in a state on the left end side of (b) where the gate signal G1 causes switching operation and the gate signal G6 is turned on, the gate signal G1 becomes turned off (switching operation stop) and the gate signal G6 becomes turned off, slightly later than the moment at which there is a zero-cross point from positive to negative of the AC current. On the other hand, the gate signal G5 starts switching operation slightly earlier than the zero-cross point of the AC current, and then becomes turned on. Similarly, in a state where the gate signal G2 causes switching operation and the gate signal G5 is turned on, the gate signal G2 becomes turned off (switching operation stop) and the gate signal G5 becomes turned off, slightly later than the moment at which there is a zero-cross point from negative to positive of the AC current. On the other hand, the gate signal G6 starts switching operation slightly earlier than the zero-cross point of the AC current, and then becomes turned on.

(c) shows the voltage between the drain and the source in the first switch S1. The applied voltage is half the voltage of the DC electrical path $L_{dc}$, and, therefore, the power loss due to switching can be reduced.

(d) shows the voltage between both ends of the AC reactor L1 (or L2). The amplitude of the pulse voltage is equal to that of the voltage of the DC electrical path $L_{dc}$. Therefore, power loss (mainly iron loss) can be reduced.

In (e), when division is performed into four similar shapes in the time axis (horizontal axis) direction, the leftmost and the third from the left represent the current flowing through the first switch S1 or the freewheeling diode d1, and the second and the fourth from the left represent the current flowing through the third switch S3 or the freewheeling diode d3.

(f) shows the current flowing through the short-circuit section 4. Distortion is suppressed.

On the other hand, also in the case where the controller 5 provides dead times, which are predetermined periods, at the beginning and end of the period in which a current flows for each of the freewheeling diodes and the diodes in the short-circuit section 4, and the switches existing in parallel with the diodes are closed as described in the above-mentioned "Generation of gate signal: second example", the same waveforms as in (a), (c), and (d) of FIG. 11 are obtained. Accordingly, power loss can be reduced, and current distortion can be suppressed.

<<Application to Minimum Switching Conversion Method>>

The circuit configuration in which the DC power supply 1 is directly connected to the full-bridge circuit 3 has been described so far. However, in the case where the voltage of the DC power supply 1 is lower than the peak value of the AC voltage, a DC/DC converter (boosting chopper) is disposed between the DC power supply 1 and the full-bridge circuit 3, and the DC voltage is boosted to the peak value of the AC voltage or higher by the DC/DC converter. At this time, a minimum switching conversion method in which a period when switching operation is alternately paused between the DC/DC converter and the full-bridge circuit 3 is provided can be applied.

Figure 12:
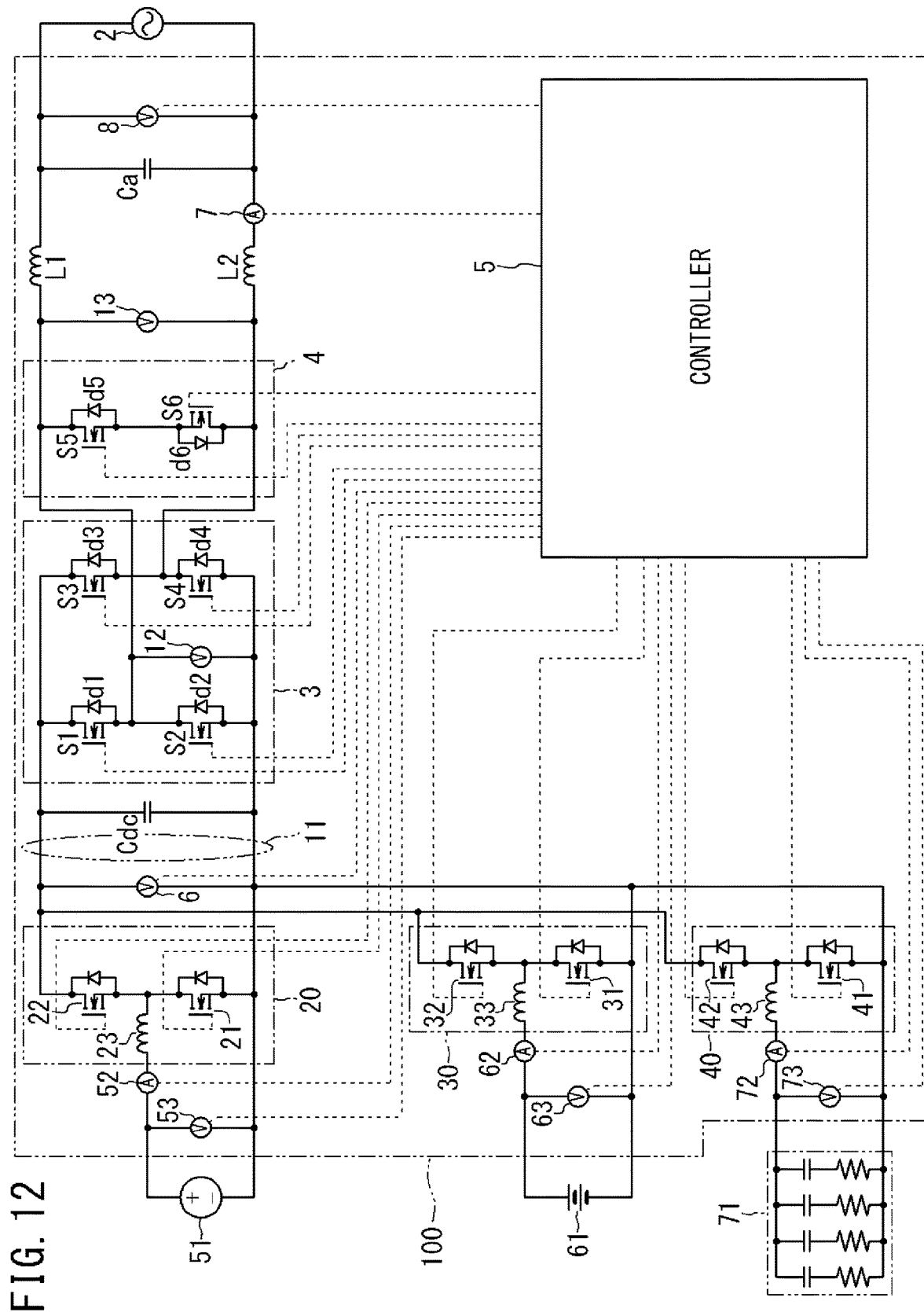
FIG. 12 is a diagram showing a circuit configuration example of a power conversion device in which a plurality of DC/DC converters are disposed before and connected to a full-bridge circuit and a short-circuit section shown in FIG. 1 via a DC bus.

FIG. 12 is a diagram showing a circuit configuration example of a power conversion device 100 in which a plurality of DC/DC converters are disposed before and connected to the full-bridge circuit 3 and the short-circuit section 4 shown in FIG. 1 via a DC bus. The entire system including this power conversion device 100 is a combined power generation system for power generation and storage.

In FIG. 12, a DC/DC converter 20, a DC/DC converter 30, and a DC/DC converter 40 are connected in parallel to two lines of a DC bus 11. The DC/DC converter 20 includes a switch 21 and a switch 22 which are, for example, MOSFETs, and a DC reactor 23. For example, a photovoltaic panel 51 is connected to the DC/DC converter 20. A current sensor 52 detects the current flowing through the DC/DC converter 20 and sends the detection output to the controller 5. A voltage sensor 53 detects the voltage provided by the photovoltaic panel 51 and sends the detection output to the controller 5.

Moreover, the DC/DC converter 30 includes a switch 31 and a switch 32 which are, for example, MOS-MOSFETs, and a DC reactor 33. A storage battery 61 is connected to the DC/DC converter 30. A current sensor 62 detects the current flowing through the DC/DC converter 30 and sends the detection output to the controller 5. A voltage sensor 63 detects the voltage of the storage battery 61 and sends the detection output to the controller 5.

Furthermore, the DC/DC converter 40 includes a switch 41 and a switch 42 which are, for example, MOS-MOSFETs, and a DC reactor 43. An electrolytic capacitor 71 is connected to the DC/DC converter 40. A current sensor 72 detects the current flowing through the DC/DC converter 40 and sends the detection output to the controller 5. A voltage sensor 73 detects the voltage of the electrolytic capacitor 71 and sends the detection output to the controller 5.

The three DC/DC converters 20, 30, and 40 control the generated power of the photovoltaic panel 51, the charge/discharge power of the storage battery 61, and the reactive power supplied from the electrolytic capacitor 71, respectively. For example, the voltage of the storage battery 61 is 50V, and the voltage of the photovoltaic panel 51 is 200V.

A voltage sensor 12 for detecting the voltage between both ends of the switch S2 is provided in the full-bridge circuit 3. A voltage sensor 13 is provided between two lines of the short-circuit section 4. The other circuit elements are the same as those in FIG. 1, and thus the description thereof is omitted.

As for the minimum switching conversion method, the present applicant has already made many proposals, the minimum switching conversion method is known (for example, Japanese Patent No. 5618022, Japanese Patent No. 6187587, and many other publicly known documents), and thus the detailed description thereof is omitted. A main part of the minimum switching conversion method can be expressed as follows, for example.

The controller 5 compares the DC voltage on the low voltage side of the DC/DC converter 20 and the absolute value of the voltage target value on the AC side of the full-bridge circuit 3 with each other every half cycle of alternating current. When the DC voltage is lower, the controller 5 operates the DC/DC converters 20 and 40, and the full-bridge circuit 3 (and the short-circuit section 4) stops switching operation and performs only the necessary polarity inversion. On the other hand, when the absolute value of the voltage target value is lower, the controller 5 stops switching operation of the DC/DC converters 20 and 40 and causes the full-bridge circuit 3 (and the short-circuit section 4) to perform switching operation. Accordingly, a switching pause period of the DC/DC converters 20 and 40 and a switching pause period of the full-bridge circuit 3 can be alternately provided, so that switching loss can be suppressed.

<<Supplementary Note>>

The embodiments disclosed herein are merely illustrative in all aspects and should be considered not restrictive. The scope of the present disclosure is defined by the scope of the claims, and is intended to include meaning equivalent to the scope of the claims and all modifications within the scope.

REFERENCE SIGNS LIST

1 DC power supply
2 commercial power grid
3 full-bridge circuit
4 short-circuit section
5 controller
6 voltage sensor
7 current sensor
8 voltage sensor
10 power conversion device
11 DC bus
12 voltage sensor
13 voltage sensor
20 DC/DC converter
21, 22 switch
23 DC reactor
30 DC/DC converter
31, 32 switch
33 DC reactor
40 DC/DC converter
41, 42 switch
43 DC reactor
51 photovoltaic panel
52 current sensor
53 voltage sensor
61 storage battery
62 current sensor
63 voltage sensor
71 electrolytic capacitor
72 current sensor
73 voltage sensor
100 power conversion device
Ca AC side capacitor
Cdc DC side capacitor
d1, d2, d3, d4, d5, d6 diode
L1, L2 AC reactor
$L_{ac}$ AC electrical path
$L_{dc}$ DC electrical path
S1 first switch
S2 second switch
S3 third switch
S4 fourth switch
S5 fifth switch
S6 sixth switch

The invention claimed is:

1. A power conversion device provided between a DC electrical path and an AC electrical path and configured to perform conversion from DC to AC or vice versa, the power conversion device comprising:
a full-bridge circuit configured by a first switch, a second switch, a third switch configured to operate in synchronization with the second switch, and a fourth switch configured to operate in synchronization with the first switch;
first, second, third and fourth freewheeling diodes connected in parallel with the respective first, second, third and fourth switches and being configured for passing a current in a forward direction thereof;
an AC reactor connected between the full-bridge circuit and the AC electrical path;
a short-circuit section provided between two lines on an AC side of the full-bridge circuit and including a fifth switch configured to open and close a current conduction path from a first line to a second line of the two lines, a sixth switch configured to open and close a current conduction path from the second line to the first line, a fifth diode configured to block a current from the first line to the second line and connected in series with the sixth switch, and a sixth diode configured to block a current from the second line to the first line and connected in series with the fifth switch; and a controller configured to control the full-bridge circuit and the short-circuit section, wherein when there is a phase difference between an AC voltage of the AC electrical path and an AC current flowing through the AC reactor, the controller performs control with one cycle divided into a total of four periods, that is, a first period in which both the AC voltage and the AC current are positive, a second period in which the AC voltage is positive and the AC current is negative, a third period in which both the AC voltage and the AC current are negative, and a fourth period in which the AC voltage is negative and the AC current is positive, the controller executes, in the first period, a first control mode in which the first switch and the fourth switch are caused to perform switching operation, the second switch and the third switch are opened, and the sixth switch is closed, the controller executes, in the second period, a second control mode in which a current is passed through the first and fourth freewheeling diodes when the fifth switch is opened while the fifth switch is caused to perform switching operation, the controller executes, in the third period, a third control mode in which the second switch and the third switch are caused to perform switching operation, the first switch and the fourth switch are opened, and the fifth switch is closed, and the controller executes, in the fourth period, a fourth control mode in which a current is passed through the second and third freewheeling diodes when the sixth switch is opened while the sixth switch is caused to perform switching operation.

2. The power conversion device according to claim 1, wherein the controller delays stop of switching operation of the full-bridge circuit and delays opening or stop of switching operation of a closed switch of the fifth switch or the sixth switch, from a moment at which the AC current having a ripple superimposed therein reaches a zero-cross point.

3. The power conversion device according to claim 2, wherein, for each of the first, second, third and fourth freewheeling diodes and the fifth and sixth diodes, the controller provides a dead time that is a predetermined period, at each of the beginning and the end of a time period in which a current flows through at least one diode of the first, second, third and fourth freewheeling diodes and the fifth and sixth diodes, and closes the switch respectively connected in parallel with the at least one diode.

4. The power conversion device according to claim 2, wherein
a DC/DC converter is provided on a DC side of the full-bridge circuit, and
the controller compares a DC voltage on a low voltage side of the DC/DC converter and an absolute value of a voltage target value on the AC side of the full-bridge circuit with each other;
when the DC voltage is lower, the controller operates the DC/DC converter and stops switching operation of the full-bridge circuit with performing only necessary polarity inversion; and
when the absolute value of the voltage target value is lower, the controller stops switching operation of the DC/DC converter and causes the full-bridge circuit to perform switching operation.

5. The power conversion device according to claim 1, wherein, for each of the first, second, third, and fourth freewheeling diodes and the fifth and sixth diodes, the controller provides a dead time that is a predetermined period, at each of the beginning and the end of a time period in which a current flows through at least one diode of the first, second, third and fourth freewheeling diodes and the fifth and sixth diodes, and closes the switch respectively connected in parallel with the at least one diode.

6. The power conversion device according to claim 5, wherein
a DC/DC converter is provided on a DC side of the full-bridge circuit, and
the controller compares a DC voltage on a low voltage side of the DC/DC converter and an absolute value of a voltage target value on the AC side of the full-bridge circuit with each other;
when the DC voltage is lower, the controller operates the DC/DC converter and stops switching operation of the full-bridge circuit with performing only necessary polarity inversion; and
when the absolute value of the voltage target value is lower, the controller stops switching operation of the DC/DC converter and causes the full-bridge circuit to perform switching operation.

7. The power conversion device according to claim 1, wherein
a DC/DC converter is provided on a DC side of the full-bridge circuit, and
the controller compares a DC voltage on a low voltage side of the DC/DC converter and an absolute value of a voltage target value on the AC side of the full-bridge circuit with each other;
when the DC voltage is lower, the controller operates the DC/DC converter and stops switching operation of the full-bridge circuit with performing only necessary polarity inversion; and
when the absolute value of the voltage target value is lower, the controller stops switching operation of the DC/DC converter and causes the full-bridge circuit to perform switching operation.

8. The power conversion device according to claim 1, wherein
the controller complementarily closes the first switch and the fifth switch when both the first switch and the fifth switch perform switching operation, and
the controller complementarily closes the second switch and the sixth switch when both the second switch and the sixth switch perform switching operation.

9. A control method for a power conversion device provided between a DC electrical path and an AC electrical path and including a full-bridge circuit configured by first, second, third and fourth switches and first, second, third and fourth freewheeling diodes and a short-circuit section and an AC reactor connected on an AC side of the full-bridge circuit, the control method being executed by a controller, the control method comprising:
when there is a phase difference between an AC voltage of the AC electrical path and an AC current flowing through the AC reactor, performing control with one cycle divided into a total of four periods, that is, a first period in which both the AC voltage and the AC current are positive, a second period in which the AC voltage is positive and the AC current is negative, a third period in which both the AC voltage and the AC current are negative, and a fourth period in which the AC voltage is negative and the AC current is positive;
executing, in the first period, control that alternately has a powering period in which the full-bridge circuit is caused to perform switching operation and a current is passed through the full-bridge circuit in a positive direction and a freewheeling period in which a current is passed through the short-circuit section in the positive direction in a state where the first, second, third, and fourth switches of the full-bridge circuit are opened;

executing, in the second period, control that alternately has a powering period in which the short-circuit section is caused to perform switching operation and a current is passed through the short-circuit section in a negative direction and a freewheeling period in which a current is passed through the first and fourth freewheeling diodes of the full-bridge circuit in the negative direction in a state where the first, second, third and fourth switches are opened;

executing, in the third period, control that alternately has a powering period in which the full-bridge circuit is caused to perform switching operation and a current is passed through the full-bridge circuit in the negative direction and a freewheeling period in which a current is passed through the short-circuit section in the negative direction in a state where the first, second, third and fourth switches are opened; and executing, in the fourth period, control that alternately has a powering period in which the short-circuit section is caused to perform switching operation and a current is passed through the short-circuit section in the positive direction and a freewheeling period in which a current is passed through the second and third freewheeling diodes in the positive direction in a state where the first, second, third and fourth switches are opened.

* * * * *